United States Patent
Saso et al.

(10) Patent No.: US 10,350,799 B2
(45) Date of Patent: Jul. 16, 2019

(54) GASKET INCLUDING CARRIER FILM AND METHOD OF MANUFACTURING THE SAME

(71) Applicant: NOK CORPORATION, Tokyo (JP)

(72) Inventors: Hidetoshi Saso, Fujisawa (JP); Yoshihiro Kurano, Kikugawa (JP); Takayuki Horimoto, Fujisawa (JP); Tetsuya Urakawa, Fujisawa (JP); Kenichi Oba, Fujisawa (JP); Takuro Nishimura, Fujisawa (JP); Hajime Yui, Fujisawa (JP); Takahiro Hayashi, Fujisawa (JP)

(73) Assignee: NOK Corporation (JP)

( * ) Notice: Subject to any disclaimer, the term of this patent is extended or adjusted under 35 U.S.C. 154(b) by 18 days.

(21) Appl. No.: 15/565,080

(22) PCT Filed: Feb. 17, 2016

(86) PCT No.: PCT/JP2016/054496
§ 371 (c)(1),
(2) Date: Oct. 6, 2017

(87) PCT Pub. No.: WO2016/163158
PCT Pub. Date: Oct. 13, 2016

(65) Prior Publication Data
US 2018/0099439 A1    Apr. 12, 2018

(30) Foreign Application Priority Data

Apr. 9, 2015    (JP) .................................. 2015-079732
Dec. 22, 2015   (JP) .................................. 2015-249637

(51) Int. Cl.
*B29C 45/14*    (2006.01)
*F16J 15/06*    (2006.01)
(Continued)

(52) U.S. Cl.
CPC ........ *B29C 45/14* (2013.01); *B29C 45/14754* (2013.01); *F16J 15/061* (2013.01);
(Continued)

(58) Field of Classification Search
CPC ............. B29C 45/14; B29C 45/14754; B29C 45/1418; B29C 2045/1477;
(Continued)

(56) References Cited

U.S. PATENT DOCUMENTS 2,914,597 A * 11/1959 Gutmann ................ H01M 2/12
220/281
2010/0307658 A1* 12/2010 Galush ................... B32B 27/08
156/71

FOREIGN PATENT DOCUMENTS

CN    101032046 A    9/2007
CN    101213251 A    7/2008
(Continued)

OTHER PUBLICATIONS

Extended European Search Report for Application No. EP 16 77 6327 dated Apr. 5, 2018 (8 pages).

*Primary Examiner* — Gary D Harris
(74) *Attorney, Agent, or Firm* — Harness, Dickey & Pierce, P.L.C.

(57) ABSTRACT

The purpose of this invention is to make it easy to handle all-rubber gaskets. To achieve this purpose, a gasket is characterized in that a gasket body of only rubber is combined with a carrier film that is made from a resin film to hold the gasket body in a non-adhesive state. A three-dimensional portion having a shape that is deformed along the external shape of the gasket body is provided at a position where the gasket body and a plane of the carrier film overlap, and a portion of the gasket body is contained in the
(Continued)

three-dimensional section. The gasket body is used as a gasket for fuel cells incorporated into a fuel cell stack.

9 Claims, 10 Drawing Sheets

(51) Int. Cl.
  F16J 15/10      (2006.01)
  H01M 8/0273     (2016.01)
  H01M 8/0276     (2016.01)
  H01M 8/0284     (2016.01)
  H01M 8/0286     (2016.01)
  H01M 8/1018     (2016.01)

(52) U.S. Cl.
  CPC .............. F16J 15/10 (2013.01); F16J 15/106 (2013.01); F16J 15/108 (2013.01); H01M 8/0273 (2013.01); H01M 8/0276 (2013.01); H01M 8/0278 (2013.01); H01M 8/0284 (2013.01); H01M 8/0286 (2013.01); B29C 45/1418 (2013.01); B29C 45/14336 (2013.01); B29C 2045/1477 (2013.01); B29C 2045/14459 (2013.01); B29K 2995/0094 (2013.01); B32B 2307/51 (2013.01); B32B 2581/00 (2013.01); H01M 2008/1095 (2013.01); Y02P 70/56 (2015.11)

(58) Field of Classification Search
  CPC ...... B29C 2045/14459; B29C 45/14336; F16J 15/106; F16J 15/108; F16J 15/061; F16J 15/10; H01M 8/0286; H01M 8/0273; H01M 8/0276; H01M 8/0278; H01M 8/0284; H01M 2008/1095; B32B 2307/51; B32B 2581/00; Y02P 70/56; B29K 2995/0094
  USPC ........................................................ 429/508
  See application file for complete search history.

(56) References Cited

FOREIGN PATENT DOCUMENTS

| | | |
|---|---|---|
| JP | S54-159552 A | 12/1979 |
| JP | H03-138116 A | 6/1991 |
| JP | 2001-185174 A | 7/2001 |
| JP | 2002-147610 A | 5/2002 |
| JP | 2005-003181 A | 1/2005 |
| JP | 2010-174146 A | 8/2010 |
| JP | 2014-060133 A | 4/2014 |
| JP | 3194843 U | 12/2014 |

* cited by examiner

GASKET INCLUDING CARRIER FILM AND METHOD OF MANUFACTURING THE SAME

CROSS-REFERENCE TO RELATED APPLICATIONS

This application is a U.S. National Stage Application of International Application No. PCT/JP2016/054496, filed on Feb. 17, 2016, and published in Japanese as WO 2016/163158 A1 on Oct. 13, 2016 and claims priority to Japanese Application Nos. 2015-079732, filed on Apr. 9, 2015 and 2015-249637, filed on Dec. 22, 2015. The entire disclosures of the above applications are incorporated herein by reference.

BACKGROUND OF THE INVENTION

Field of the Invention

The present invention relates to a gasket according to a seal technique, and a method of manufacturing the same. The gasket according to the present invention is used, for example, as a gasket for a fuel battery, or a general gasket for the other intended use.

Description of the Conventional Art

The gasket for the fuel battery includes various gaskets having various structures such as a rubber only type gasket which is constructed by a gasket single part made of a rubber-like elastic material (a rubber), a separator integrated gasket which is obtained by integrally molding the gasket made of the rubber-like elastic material in a separator, and a GDL integrated gasket which is obtained by integrally molding the gasket made of the rubber-like elastic material in a gas diffusion layer (GDL).

These gaskets have respective characteristics. However, since request for cost reduction is severe in recent years, a rubber only type gasket which can satisfy the request is going to be paid attention.

The rubber only type gasket is structured, for example, as shown in FIGS. 9A and 9B.

More specifically, a gasket 11 is formed into a flat surface shape (a flat plate shape) as a whole, and an outer peripheral seal portion 12 for sealing a periphery of a reaction surface of a fuel battery over all the periphery is provided like a frame shape which is a rectangular flat surface. Further, since it is necessary to partition the reaction surface of the fuel battery and each of manifold portions, an inside seal portion 13 is integrally formed in an inner side (each of four corners) of the outer peripheral seal portion 12. A cross sectional shape of the gasket 11 is formed into a circular cross section as shown in FIG. 9B.

However, in the rubber only type gasket 11 for the fuel battery, there is room for further improvement in the following point.

More specifically, the gasket 11 for the fuel battery is generally set to such a size as 400 mm×300 mm in a flat surface outer shape, and a cross sectional shape (a wire diameter) thereof is on the contrary set to be small, such as 1 mm to several mm. Therefore, twist tends to be generated in the gasket 11 single part when being carried or when being stacked, and a handling workability (a handling performance) thereof is not good.

The present invention is made by taking the above point into consideration, and an object of the present invention is to improve a handling workability of a rubber only type gasket.

SUMMARY OF THE INVENTION

In order to achieve the object mentioned above, a gasket according to the present invention is characterized in that the gasket is constructed by a combination of a rubber only type gasket main body, and a carrier film which is made of a resin film retaining the gasket main body in a non-bonded state (the first aspect).

In the present invention, the handling workability of the gasket is improved by retaining the rubber only type gasket main body by the carrier film which is made of the resin film. The gasket main body and the carrier film are not bonded, and the gasket main body can be accordingly detached from the carrier film when being stacked.

Since the gasket main body is formed into the flat surface shape (the flat plate shape) and the carrier film made of the resin film is also formed into the flat surface shape (the flat plate shape), there is fear that the gasket main body can not be firmly retained by the carrier film only putting the gasket main body on the carrier film. Therefore, in order to devise a countermeasure, it is preferable that the gasket main body is partly accommodated within a three-dimensional portion having a shape which is deformed along an outer shape of the gasket main body by arranging the three-dimensional portion at a position in the carrier film which laps over the gasket main body in a plane. According to the structure, since the gasket main body is positioned in the plane in relation to the carrier film, the gasket main body can be firmly retained by the carrier film (the second aspect).

Further, it can be thought that the gasket main body is prevented from coming off in relation to the three-dimensional portion by arranging an undercut shape in the three-dimensional portion (the third aspect).

A material of the carrier film is not particularly limited, however, in the case that the material employs a film which is made of engineering plastic such as polyamide (PA) or polybutylene terephthalate (PBT), the carrier film is easily detached form the gasket main body even if the gasket main body is adhered to the carrier film (the fourth aspect).

The gasket according to the present invention is used, for example, as the gasket for the fuel battery. Since the number of stack lamination is larger in the fuel battery, a small thickness is required in the gasket. Since the gasket having the small thickness tends to be twisted, the handling workability is not good. Therefore, it is extremely effective for achieving efficiency of a stacking work to improve the handling workability by combining the gasket main body with the carrier film which is made of the resin film, in a field of the gasket for the fuel battery which tends to be twisted due to the small thickness as mentioned above (the fifth aspect).

A method of manufacturing a gasket sequentially executes a step of mold clamping a metal mold in a state in which a carrier film having a flat surface shape in a parting portion of the metal mold forming a gasket main body, a step of forming the gasket main body by the metal mold, and forming a three-dimensional portion by deforming a part in a plane of the carrier film along an inner surface of a metal mold cavity with a forming material filling pressure at this time, and a step of opening the mold after the formation of the gasket main body, and thereafter taking out the gasket main body and the carrier film simultaneously from the metal mold. The carrier film is initially formed into the flat surface shape, however, is partly formed into a three-dimensional shape by utilizing the forming material filling pressure and is fitted to the gasket main body at the position which is formed into the three-dimensional shape. Therefore, the carrier film is high in a retention force (the sixth aspect).

Further, it is thought that the gasket main body is prevented from coming off in relation to the metal mold by arranging an undercut shape in an inner surface of a cavity of the metal mold. According to this structure, the carrier film is stuck to one split mold and the gasket main body is stuck to the other split mold when the mold is opened after the formation, so that it is possible to inhibit the gasket main body from being peeled off and separated from the carrier film (the seventh aspect).

Effect of the Invention

According to the present invention, since the rubber only type gasket main body is combined with the carrier film which is made of the resin film, it is possible to improve the handling workability of the rubber only type gasket.

BRIEF EXPLANATION OF THE DRAWINGS

FIGS. 1A and 1B are views showing a gasket according to an embodiment of the present invention, in which FIG. 1A is a plan view and FIG. 1B is an enlarged cross sectional view along a line C-C in FIG. 1A;

FIGS. 9A and 9B are views showing a gasket according to the conventional example, in which FIG. 9A is a plan view of the same and FIG. 9B is an enlarged cross sectional view along a line B-B in FIG. 9A.

DETAILED DESCRIPTION OF PREFERRED EMBODIMENTS

The following embodiments are included in the present invention.

(1) The present invention relates to a gasket with a carrier film.

(2) A gasket with a carrier film in which a film for a carrier is simultaneously formed when a rubber only gasket is manufactured. The present gasket is structured such that the carrier film can be detached after stacking.

(3) A stack assembling property is improved by the carrier film. The carrier film at the center of the gasket or in an end portion thereof is used for an automatic carrier when being assembled by stacking. Since the gasket is corrected by the carrier film, there is no problem in twist. Since the carrier film can be detached after stacking, reduction of a vehicle weight is caused.

(4) The carrier film employs the engineering plastic (the polyamide (PA) or the polybutylene terephthalate (PBT)).

(5) The rubber single part (the rubber only gasket) is formed by using the carrier film which can be deformed into the metal mold shape by the mold temperature and the forming pressure. The rubber single part has a lip structure having a sealing performance, is formed in each of an upper surface of the film and a lower surface via the film, and provides a gasket which can seal with further space saving in comparison with a rectangular or O-ring cross section. According to the structure, it is possible to achieve the further space saving in comparison with the rectangular or O-ring cross section since it is possible to form with a small cross section. Since the product (the rubber only gasket) after the formation is always on the carrier film, a handling property is widely improved. It is possible to easily make a study of automation of a line by controlling the come-off and peeling of the gasket itself from the carrier film. It is possible to suppress burrs in a parting line by mold clamping the carrier film.

(6) In the present manufacturing method of directly injection molding the rubber material to the film which is arranged within the metal mold, the film can be freely deformed in such a manner as to be along the metal mold shape. As a result, a product is designed so that a product shape is previously an under shape in relation to the metal mold, and is formed into the same shape in relation to the metal mold shape. The lower mold (the film surface side) is formed into the under shape even in the case that the gasket main body is stuck to the upper mold side when being mold opened since the metal mold is formed into the under structure. As a result, the gasket main body is not peeled off from the film.

Embodiment

Next, a description will be given of an embodiment according to the present invention with reference to the accompanying drawings.

Figure 1A:
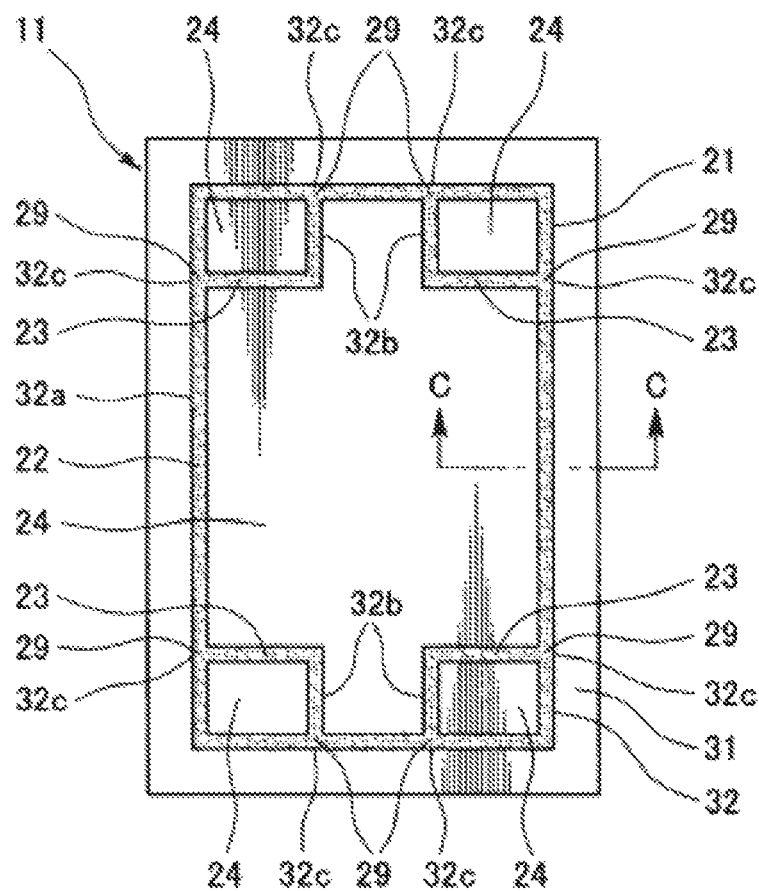
Figure 1B:
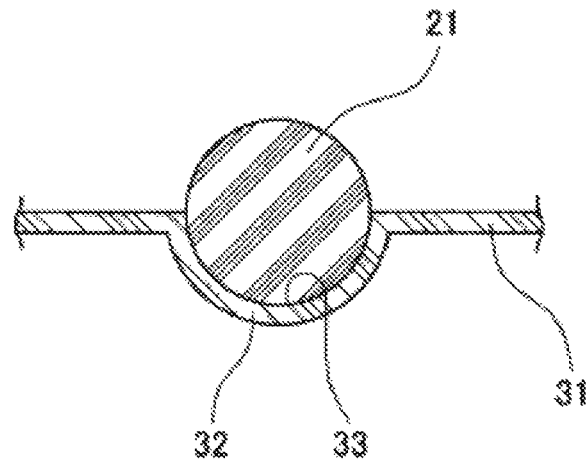

As shown in FIGS. 1A and 1B, a gasket 11 according to the embodiment is constructed by a combination of a rubber only type gasket main body 21, and a carrier film 31 which is made of a resin film retaining the gasket main body 21 in a non-bonded state. The gasket main body 21 is used as a gasket for a fuel battery. The carrier film 31 is also called as a carrier sheet or a gasket retention member.

The gasket main body 21 is formed into a flat surface shape (a flat plate shape) as a whole by a predetermined rubber-like elastic material (for example, VMQ, PIB, EPDM and FKM), and is provided with an outer peripheral seal portion 22 which seals around a reaction surface of a fuel battery over all the periphery like a rectangular flame shape in a flat surface. Further, in order to partition the reaction surface of the fuel battery and each of manifolds, an inside seal portion 23 is integrally formed in an inner side (each of four corners) of the outer peripheral seal portion 22. Each of the inside seal portions 23 is formed into an L-shaped flat surface. As a result, the inside seal portion 23 and the outer peripheral seal portion 22 having the rectangular flat surface shape are formed into a shape in which the inside seal portion 23 and the outer peripheral seal portion 22 are connected at an intersection portion 29 which is formed into a T-shaped flat surface. A cross sectional shape of the gasket main body 21 is formed into a circular cross section as shown in FIG. 1B. Reference numeral 24 denotes a penetration portion (a space portion) which passes through the gasket main body 21 in its thickness direction. The gasket main body 21 is formed into a rectangular flat surface shape as a whole, is set its planar size to have an outer shape with about 400 mm (vertical)×about 300 mm (horizontal), and is set its thickness, that is, its wire diameter to be approximately 1 mm.

The carrier film 31 is formed into a flat surface shape (a flat plate shape) by a predetermined resin film, and is formed into a rectangular flat surface which is one size larger than the gasket main body 21. The resin film employs, for example, a polypropylene film having a thickness of 0.2 mm, and is used by cutting the polypropylene film into a flat surface shape having the size mentioned above. General resin materials such as polyethylene and polystyrene can be used in addition to the polypropylene for the resin film. A thickness of the film is preferably set to be between 0.1 mm and 0.3 mm in correspondence to the wire diameter and the cross sectional shape of the gasket main body 21.

A three-dimensional portion (a gasket retention portion having a three-dimensional form) 32 is provided at a position which is arranged on a part of the flat surface of the carrier film 31 and laps over the gasket main body 21 in a plane, the three-dimensional portion 32 being formed into a shape which is deformed along an outer shape of the gasket main body 21 (an outer contour line in the cross sectional shape of the gasket main body 21). A part of the gasket main body 21 is accommodated in the three-dimensional portion 32. Since the cross sectional shape of the gasket main body 21 is formed into the circular cross section as mentioned above in the embodiment, a cross sectional shape of the three-dimensional portion 32 is formed into a circular arc cross sectional shape (a half circular shape) in correspondence thereto. A lower half position in one side in a thickness direction of the gasket main body 21 is accommodated within a space portion 33 which is provided in a back surface side of the three-dimensional portion 32 and is formed into a groove shape, on the basis of the provision of the three-dimensional portion 32 having the circular arc cross sectional shape as mentioned above.

The gasket main body 21 is used as the gasket for the fuel battery as mentioned above, and integrally has the outer peripheral seal portion 22 which is formed into the rectangular frame shaped flat surface, the inside seal portion 23 which is formed into the L-shaped flat surface, and the intersection portion 29 which is formed into the T-shaped flat surface. Therefore, the three-dimensional portion 32 of the carrier film 31 continuously has on its plane an outer peripheral seal retention portion 32a which is formed into a rectangular frame shaped flat surface for retaining the outer peripheral seal portion 22, an inside seal retention portion 32b which is formed into an L-shaped flat surface for retaining the inside seal portion 23, and an intersection portion retention portion 32c which is formed into a T-shaped flat surface for retaining the intersection portion 29, for retaining the gasket main body 21 having the shape as mentioned above.

Further, the three-dimensional portion 32 may be formed so that a thickness (a film thickness) thereof is smaller than a thickness (a film thickness) of the other flat plate shaped position than the three-dimensional portion 32 in the carrier film 31. In the case that the thickness of the three-dimensional portion 32 is made small as mentioned above, the three-dimensional portion 32 tends to be deformed and tends to be inverted in a film thickness direction. Therefore, it is possible to easily carry out a work for detaching the carrier film 31 from the gasket main body 21. The inverse of the three-dimensional portion 32 means deformation of the three-dimensional portion 32 protruding out to one side in the film thickness direction in such a manner as to protrude to the other side in the film thickness direction.

Since the gasket main body 21 is not bonded to the carrier film 31, the gasket main body 21 can be detached from the carrier film 31 when being stacked. In the case that the gasket main body 21 is formed in a state in which the carrier film 31 is inserted into a metal mold 41 (FIG. 4) which forms the gasket main body 21 as mentioned later, the gasket main body 21 is set to a state of being adhered to the carrier film 31 since the formed gasket main body 21 is provided with a adhesion. The adhesion has such a small adhesive force as to be detached by a chucking device. Therefore, in this case, the rubber only type gasket main body 21 is not bonded to the carrier film 31 which is made of the resin film, but is adhered in such a manner as to be capable of being peeled off. In order to easily peel the adhered state, it is preferably to employ a film which is made of the engineering plastic such as the polyamide (PA) or the polybutylene terephthalate (PBT) for the material of the carrier film 31.

In the gasket 11 having the structure mentioned above, since the rubber only type gasket main body 21 is retained by the carrier film 31 which is made of the resin film, the gasket main body 21 is hard to be twisted when the gasket 11 is carried, and the gasket 11 can be easily carried. Further, since the gasket main body 21 is not bonded to the carrier film 31, the gasket main body 21 can be easily detached from the carrier film 31 when being stacked. Therefore, it is possible to improve a handling workability of the gasket 11.

Further, since the three-dimensional portion 32 is provided in the carrier film 31 and a part of the gasket main body 21 is accommodated within the three-dimensional portion 32, the gasket main body 21 is positioned on a plane in relation to the carrier film 31. Therefore, since the gasket main body 21 is not displaced in relation to the carrier film 31 when the gasket 11 is carried, the gasket main body 21 can be firmly retained by the carrier film 31.

Further, in correspondence to the structure in which the gasket main body 21 is used as the gasket for the fuel battery as mentioned above, and integrally has the outer peripheral seal portion 22 which is formed into the rectangular frame shaped flat surface, the inside seal portion 23 which is formed into the L-shaped flat surface, and the intersection portion 29 which is formed into the T-shaped flat surface, the three-dimensional portion 32 of the carrier film 31 continuously has on the plane the outer peripheral seal retention portion 32a which is formed into the rectangular frame shaped flat surface for retaining the outer peripheral seal portion 22, the inside seal retention portion 32b which is formed into the L-shaped flat surface for retaining the inside seal portion 23, and the intersection portion retention portion 32c which is formed into the T-shaped flat surface for retaining the intersection portion 29. As a result, the carrier film 31 structured such that the three-dimensional portion 32 is arranged vertically and horizontally in the rectangular flat surface as mentioned above is high in a strength against a curving deformation in comparison with the carrier film which is constructed only by the flat plate. Particularly, the intersection portion retention portion 32c formed into the T-shaped flat surface is high in its strength since the outer peripheral seal retention portion 32a and the inside seal retention portion 32b intersect perpendicularly. Therefore, the carrier film 31 having the thin plate form can be provided with the strength against the curving deformation.

With regard to the cross sectional shape of the gasket main body 21 and the cross sectional shape of the three-dimensional portion 32 corresponding thereto, various cross sections can be thought in correspondence to the use conditions of the gasket main body 21, for example, the following cross sectional shapes can be employed.

Figure 2A:
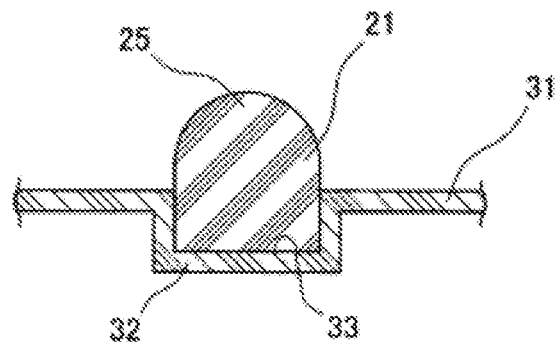
FIGS. 2A, 2B, 2C and 2D are cross sectional views respectively showing the other examples of a cross sectional shape of the gasket.

In an example of FIG. 2A, a seal lip 25 having a circular arc cross sectional shape (a semicircular shape) is integrally formed in an upper surface (all the width) of the gasket main body 21 having the rectangular cross sectional shape. In this case, since the lower half position in one side in the thickness direction of the gasket main body 21 is formed into a square cross section shape, the cross sectional shape of the three-dimensional portion 32 is also formed into a square cross section shape.

Figure 2B:
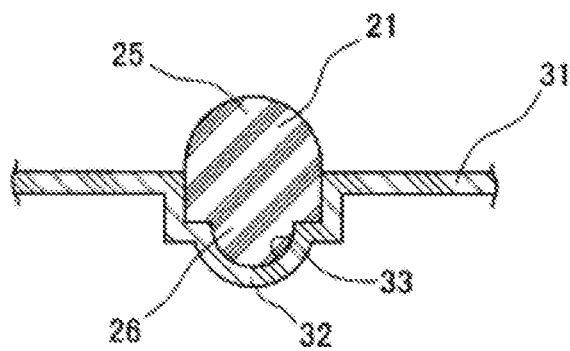

In an example of FIG. 2B, a seal lip 25 having a circular arc cross sectional shape (a semicircular shape) is integrally formed in an upper surface (all the width) of the gasket main body 21 having the rectangular cross sectional shape, and a seal lip 26 having a circular arc cross sectional shape (a semicircular shape) is integrally formed in a lower surface (a part of the width) of the gasket main body 21. In this case, since a position in a lower half section of the one side in the thickness direction of the gasket main body 21 is a combination of the polygonal cross sectional shape and the circular arc shape (the semicircular shape), the cross sectional shape of the three-dimensional portion 32 is a combination of the polygonal cross sectional shape and the circular arc shape (the semicircular shape).

Figure 2C:
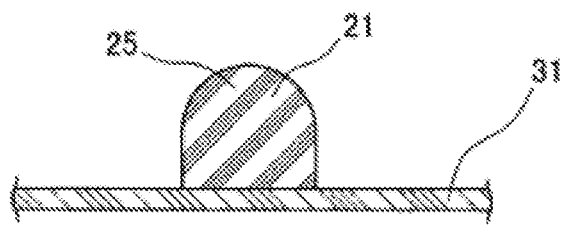

In an example of FIG. 2C, a seal lip 25 having a circular arc cross sectional shape (a semicircular shape) is integrally formed in an upper surface (all the width) of the gasket main body 21 having the rectangular cross sectional shape. On the other hand, the three-dimensional portion 32 is not provided in the carrier film 31, and the carrier film 31 is kept in the flat surface shape (the flat plate shape). Even in this case, the gasket main body 21 is retained by the carrier film 31, and the gasket main body 21 is adhered to the carrier film 31 over the full width thereof as long as the gasket main body 21 is provided with the adhesion property in its material. Therefore, the gasket main body 21 is retained by the carrier film 31 without being displaced in the direction of the sheet flat surface.

Figure 2D:
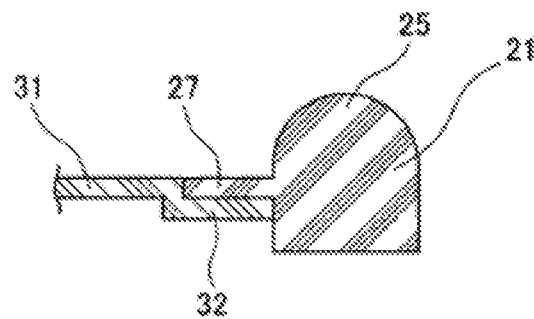

In an example of FIG. 2D, a seal lip 25 having a circular arc cross sectional shape (a semicircular shape) is integrally formed in an upper surface (all the width) of the gasket main body 21 having the rectangular cross sectional shape, and a protruding portion 27 is integrally formed in one side surface of the gasket main body 21. In this case, since the three-dimensional portion 32 of the carrier film 31 is lapped over the protruding portion 27 as shown, the gasket main body 21 is retained by the carrier film 31 as a whole. The three-dimensional portion 32 is formed into a stepped cross sectional shape.

Figure 3A:
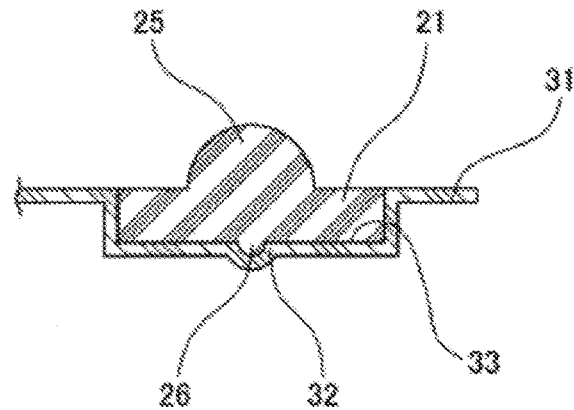
FIGS. 3A, 3B and 3C are cross sectional views respectively showing further the other examples of the cross sectional shape of the gasket.

Further, in an example of FIG. 3A, a seal lip 25 having a circular arc cross sectional shape (a semicircular shape) is integrally formed in an upper surface (a part of the width) of the gasket main body 21 having the rectangular cross sectional shape, and a seal lip 26 having a circular arc cross sectional shape (a semicircular shape) is integrally formed in a lower surface (a part of the width) of the gasket main body 21. In this case, since a position in a lower half of one side in the thickness direction of the gasket main body 21 is formed into a combination of a polygonal cross sectional shape and a circular arc shape (a semicircular shape), a cross sectional shape of the three-dimensional portion 32 is formed into a combination of the polygonal cross sectional shape and the circular arc shape (the semicircular shape).

Figure 3B:
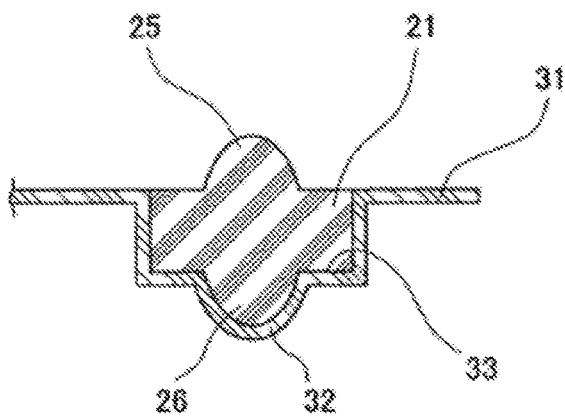

In an example of FIG. 3B, a seal lip 25 having a circular arc cross sectional shape (a semicircular shape) is integrally formed in an upper surface (a part of the width) of the gasket main body 21 having the rectangular cross sectional shape, and a seal lip 26 having a circular arc cross sectional shape (a semicircular shape) is integrally formed in a lower surface (a part of the width) of the gasket main body 21.

Figure 3C:
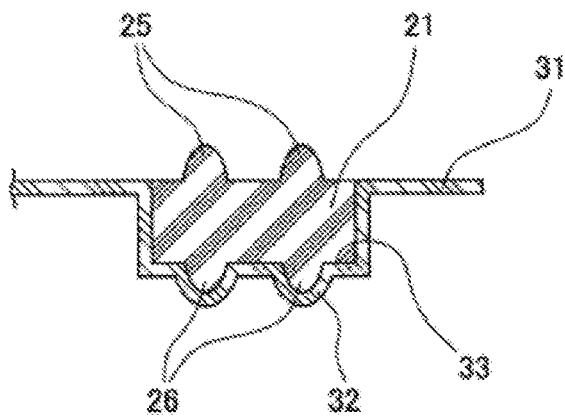

In an example of FIG. 3C, a plurality of (two in the drawing) seal lips 25 each having a circular arc cross sectional shape (a semicircular shape) are integrally formed in an upper surface (a part of the width) of the gasket main body 21 having the rectangular cross sectional shape, and a plurality of (two in the drawing) seal lips 26 each having a circular arc cross sectional shape (a semicircular shape) is integrally formed in a lower surface (a part of the width) of the gasket main body 21.

Figure 4:
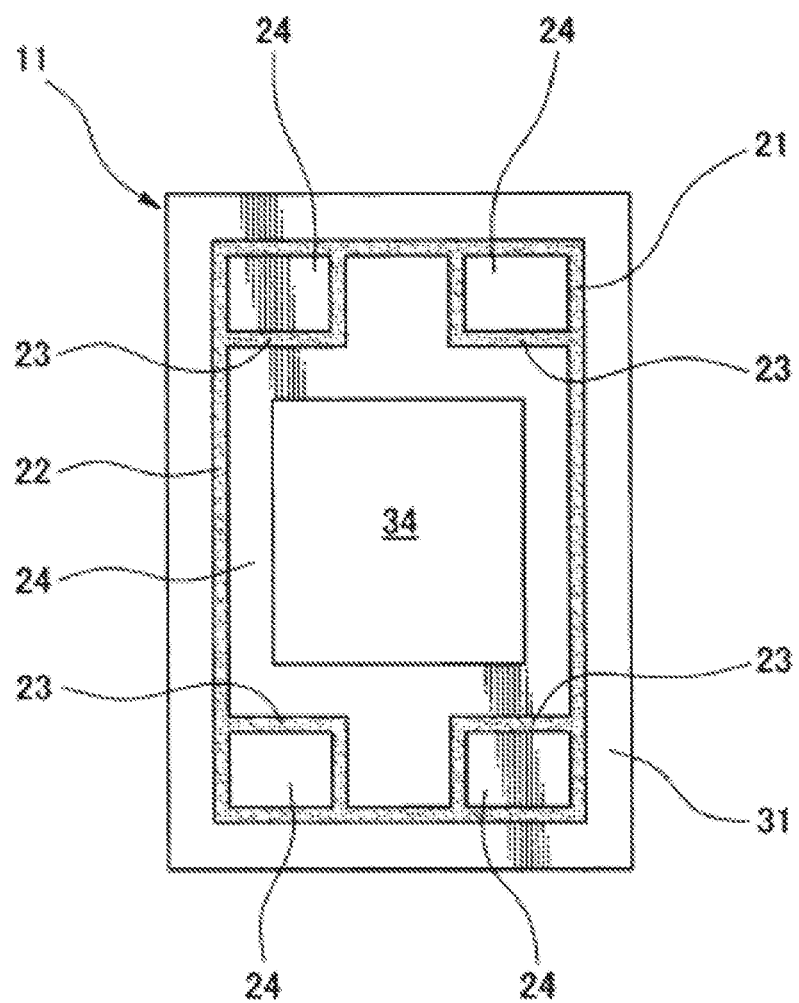
FIG. 4 is a plan view showing the other example of a flat surface shape of a carrier film.

The carrier film 31 may be structured, as shown in FIG. 4, such that a penetration portion (a space portion) 34 passing through in a thickness direction is provided at the center of the flat surface thereof. In this case, the carrier film 31 is formed into a frame shape.

Next, a description will be given of a method of manufacturing the gasket 11 mentioned above. A metal mold for injection molding the rubber only type gasket main body 21 is used for manufacturing.

Figure 5A:
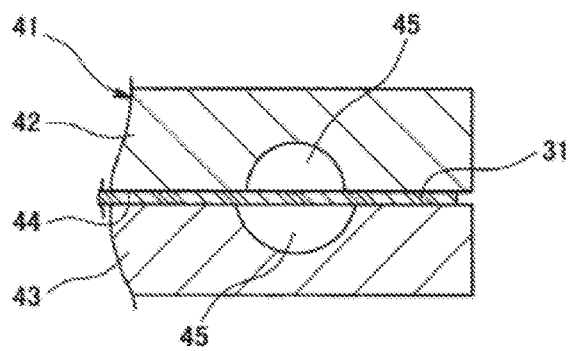
FIGS. 5A, 5B, 5C and 5D are processes explanatory views of a method of manufacturing the gasket according to an embodiment of the present invention.

In the process, first of all, the carrier film 31 having the flat surface shape obtained by cutting into a flat surface shape with a predetermined size is prepared. As shown in FIG. 5A, the metal mold 41 is clamped in a state in which the carrier film 31 is sandwiched in parting portions 44 of the metal mold 41. The metal mold 41 has a combination of an upper mold (one split mold) 42 and a lower mold (the other split mold) 43, and cavity portions 45 are correspondingly provided half by half in the parting portions 44 of both the molds 42 and 43. Since the carrier film 31 is initially formed into the flat surface shape in its whole surface, the carrier film 31 is in a state of cutting across the cavity portion 45.

Figure 5B:
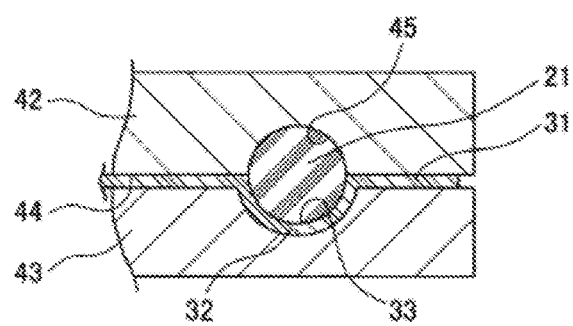

Next, as shown in FIG. 5B, the gasket main body 21 is formed by filling a molding material for forming the gasket main body 21 in the cavity portion 45 and heating the molding material. When the molding material is filled in the cavity portion 45, the carrier film 31 is pressed to an inner surface of the cavity portion 45 in its part of the plane by a forming material filling pressure, and is deformed (plastically deformed) into a shape which is along the inner surface of the cavity portion 45. As a result, the three-dimensional portion 32 is formed.

Figure 5C:
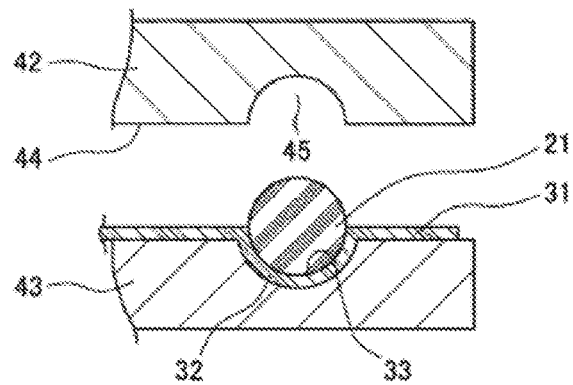
Figure 5D:
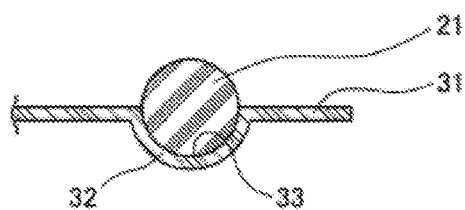

Next, as shown in FIG. 5C, the mold is opened after the formation of the gasket main body 21, and the gasket main body 21 and the carrier film 31 are simultaneously taken out of the metal mold 41 as shown in FIG. 5D. The taken-out gasket main body 21 and carrier film 31 are formed into a combination state in which the gasket main body 21 is retained by the carrier film 31, and the product is carried and stored in this combined state. The twist is hard to be generated in the gasket main body 21 which is retained by the carrier film 31, and the handling workability is accordingly improved in comparison with the case that the gasket main body 21 is handled as a single part.

Figure 6A:
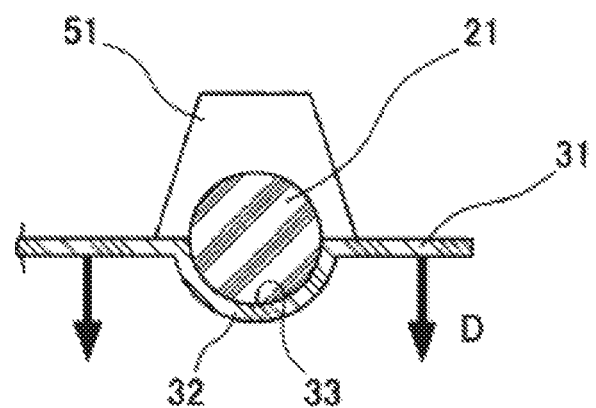
FIGS. 6A and 6B are explanatory views of a method of handling the gasket according to an embodiment of the present invention.
Figure 6B:
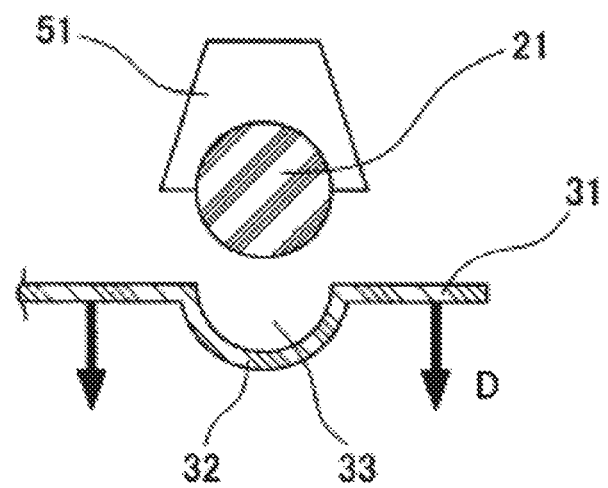

When the gasket main body 21 is assembled in a fuel battery stack, the gasket main body 21 is gripped by a chucking device 51 in a state in which the carrier film 31 is adsorbed and fixed to a base side by a vacuuming device (not shown, a vacuuming direction is shown by an arrow D) as shown in FIG. 6A, and is moved to a predetermined position by being lifted up as shown in FIG. 6B. The gasket main body 21 which does not generate any twisting is easy to be gripped by the chucking device 51, and it is possible to smoothly advance the work.

Figure 10A:
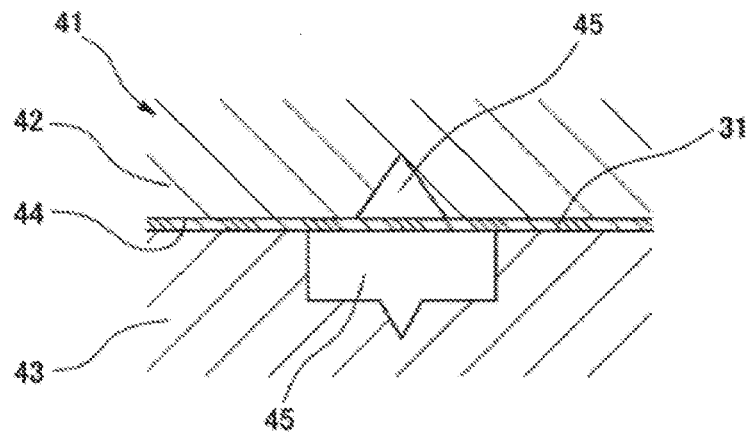
FIGS. 10A, 10B and 10C are processes explanatory views of a method of manufacturing the gasket according to a comparative example.
Figure 10B:
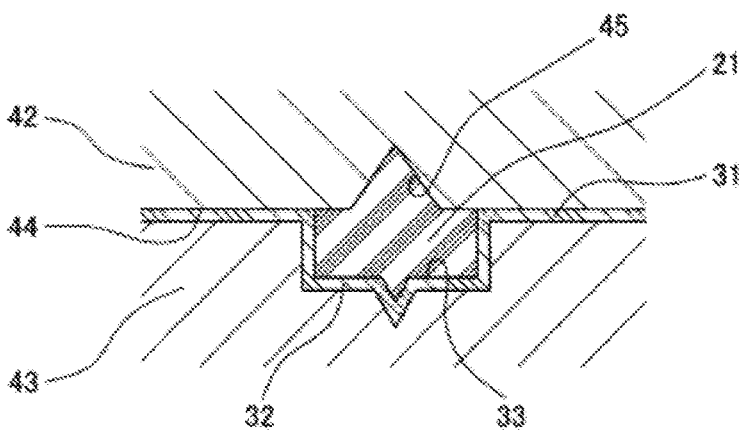
Figure 10C:
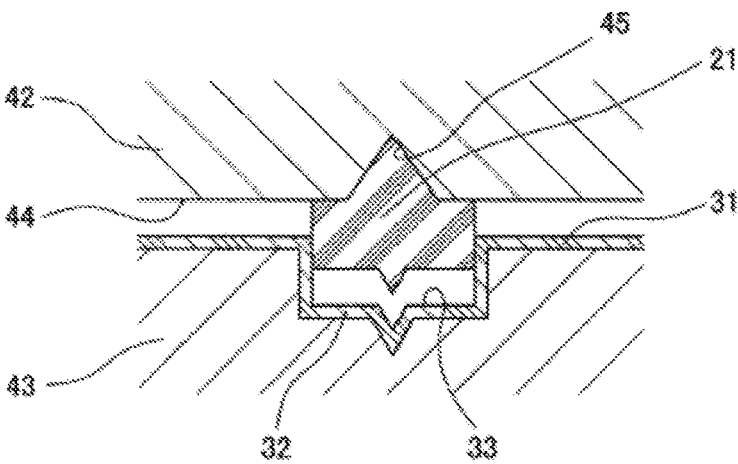

Further, as shown in FIGS. 10A, 10B and 10C for a comparative example, if the gasket main body 21 is stuck to the upper mold (the one split mold) 42 when the mold is opened and is peeled off from the carrier film 31 stuck to the lower mold (the other split mold) 43 after the gasket main body 21 is formed by the metal mold 41, the gasket main body 21 is separated from the carrier film 31. Therefore, the gasket main body 21 can not be retained by the carrier film 31.

Figure 7A:
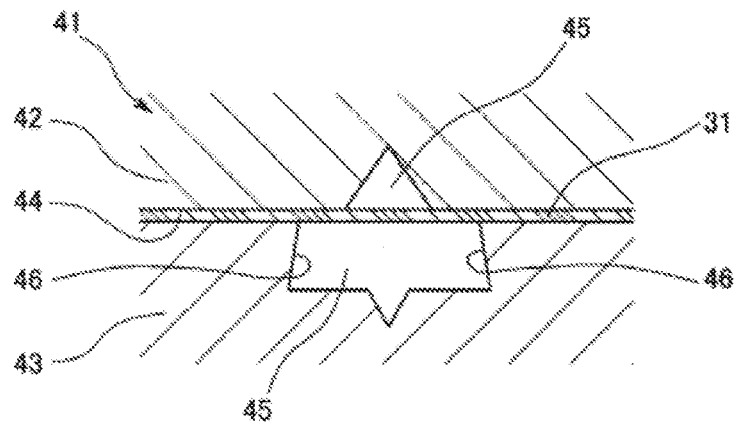
FIGS. 7A, 7B and 7C are processes explanatory views of a method of manufacturing the gasket according to the other embodiment of the present invention.
Figure 7B:
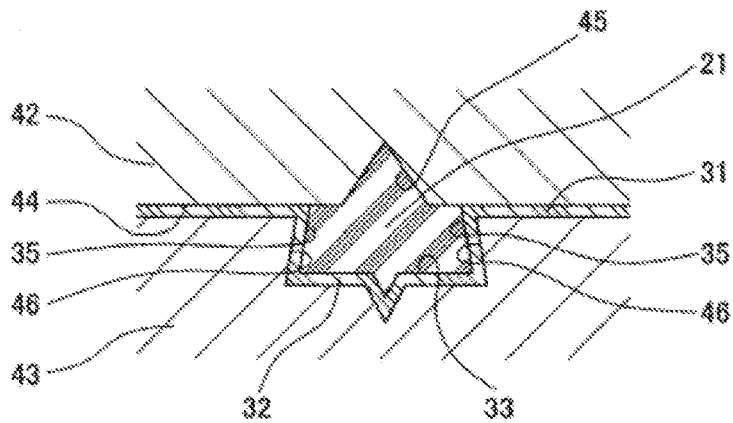
Figure 7C:
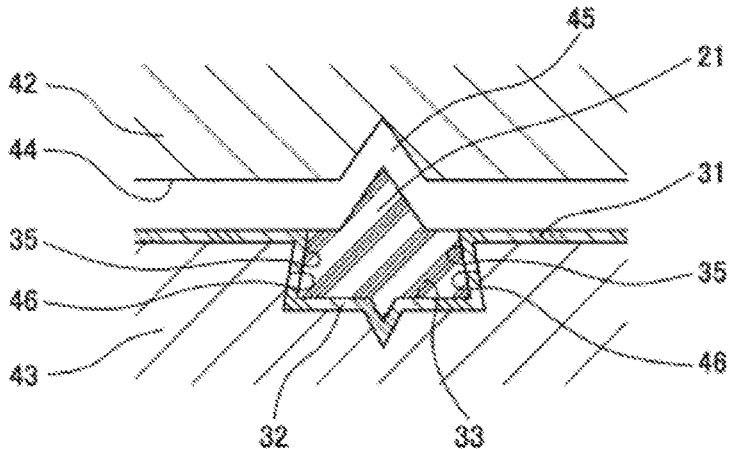

In order to devise a countermeasure, it is preferable to prevent the gasket main body 21 from being come off from the metal mold 41 by setting an undercut shape (an undercut portion) 46 on an inner surface of the cavity portion 45 of the metal mold 41 as shown in FIGS. 7A, 7B and 7C. According to this structure, it is possible to prevent the gasket main body 21 from peeling off and being separated from the carrier film 31.

The undercut shape 46 is provided in the split mold (the lower mold 43) for forming the three-dimensional portion 32 in the carrier film 31 in both the split molds of the metal mold 41. In the case that the undercut shape 46 is provided on the inner surface of the cavity portion 45 in the split mold (the lower mold 43), an undercut shape (an undercut portion) 35 is also formed in the three-dimensional portion 32 of the carrier film 31 which deforms along the cavity portion 45, and the gasket main body 21 engages with the undercut shape 35 which is formed in the three-dimensional portion 32 in a come-off direction. Therefore, the gasket main body 21 can be left in the split mold (the lower mold 43). When the carrier film 31 and the gasket main body 21 are released from the split mold (the lower mold 43), the releasing motion is carried out by getting the three-dimensional portion 32 of the carrier film 31 and the gasket main body 21 out of the cavity portion 45 while elastically deforming. Accordingly, the carrier film 31 and the gasket main body 21 can be taken out of the split mold (the lower mold 43) integrally as shown in FIG. 8.

Figure 8:
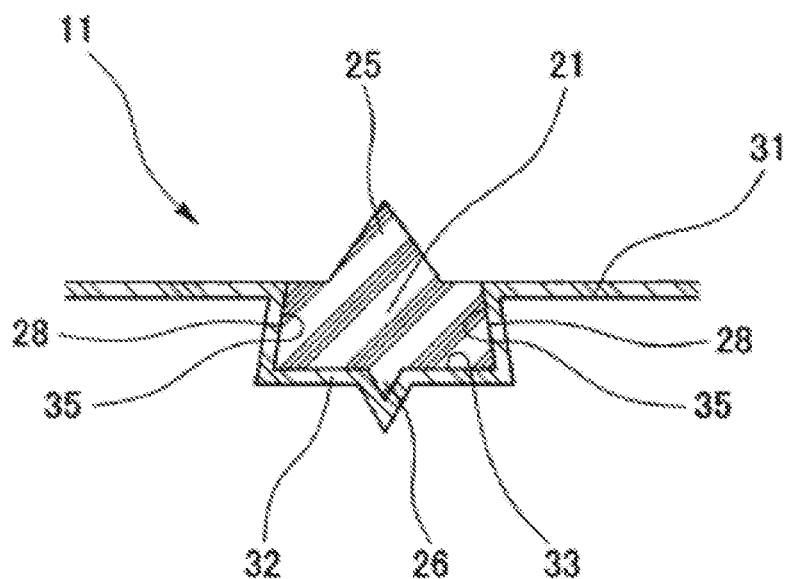
FIG. 8 is a cross sectional view of a gasket which is manufactured by the manufacturing method.
Figure 9A:
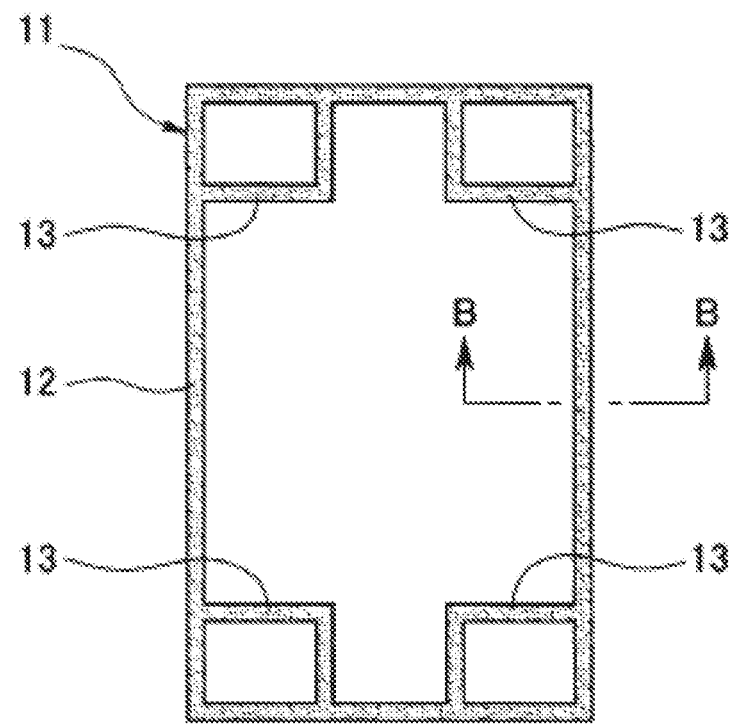
Figure 9B:
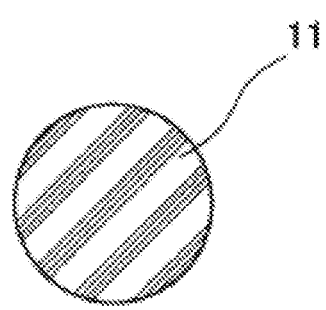

Further, as shown in FIG. 8, in the carrier film 31 and the gasket main body 21 taken out of the split mold (the lower mold 43), since the gasket main body 21 engages with the undercut shape 35 formed in the three-dimensional portion 32 of the carrier film 31 in the come-off direction, the gasket main body 21 is prevented from coming off from the carrier film 31. Therefore, it is possible to prevent the gasket main body 21 from being easily separated from the carrier film 31.

Since the gasket main body 21 shown in FIGS. 7A, 7B, 7C and 8 is formed by the cavity portion 45 having the undercut shape 46, an inclined surface portion 28 (FIG. 8) in conjunction with the undercut is provided in a side surface thereof. Therefore, the gasket main body 21 is formed as a gasket which is formed into a trapezoidal cross section, and is formed into a shape in which seal lips 25 and 26 each having a triangular cross section are integrally formed in upper and lower surfaces.

An angle of incline of the undercut shapes 35 and 46 is preferably in a range between 0.1 and 10 degrees, and more preferably in a range between 0.1 and 3 degrees.

What is claimed is:

1. A gasket comprising:
   a rubber gasket main body;
   and a carrier film made of a resin film that is configured to retain the gasket main body in a non-bonded state,
   wherein the carrier film defines a socket having a shape that corresponds to a shape of the gasket main body,
   and that is provided at a position that corresponds to a location where the gasket main body is retained by the carrier film, and
   wherein the gasket main body is partly accommodated in the socket
   wherein the gasket main body is used as a gasket for a fuel battery which is assembled in a fuel battery stack.

2. The gasket according to claim 1, wherein the socket is provided with an undercut shape which prevents the gasket main body from being removed therefrom.

3. The gasket according to claim 1, wherein the carrier film is made of an engineering plastic.

4. A method of manufacturing the gasket according to claim 2, comprising:
   a step of mold clamping a metal mold in a state in which the carrier film having a flat surface shape in a parting portion of the metal mold forming a gasket main body;
   a step of forming the gasket main body by the metal mold, and forming the socket by deforming a part in a plane of the carrier film along an inner surface of a metal mold cavity with a forming material filling pressure at this time;
   a step of opening the mold after the formation of the gasket main body, and thereafter taking out the gasket main body and the carrier film simultaneously from the metal mold; and
   the method sequentially executing these steps.

5. The method of manufacturing the gasket according to claim 4, further comprising a step of setting an undercut shape in an inner surface of a cavity in the metal mold, thereby preventing the gasket main body from detaching from the metal mold.

6. The gasket according to claim 2, wherein the carrier film is made of an engineering plastic.

7. The gasket according to claim 2, wherein the gasket main body is used as a gasket for a fuel battery which is assembled in a fuel battery stack.

8. The gasket according to claim 3, wherein the gasket main body is used as a gasket for a fuel battery which is assembled in a fuel battery stack.

9. The gasket according to claim 6, wherein the gasket main body is used as a gasket for a fuel battery which is assembled in a fuel battery stack.

* * * * *